US010102190B2

(12) United States Patent
Milvaney

(10) Patent No.: US 10,102,190 B2
(45) Date of Patent: Oct. 16, 2018

(54) MEMORY CONSERVING VERSIONING OF AN ELECTRONIC DOCUMENT

(71) Applicant: Microsoft Technology Licensing, LLC., Redmond, WA (US)

(72) Inventor: Douglas Lane Milvaney, Cambridge, MA (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 34 days.

(21) Appl. No.: 14/981,293

(22) Filed: Dec. 28, 2015

(65) Prior Publication Data

US 2017/0185573 A1    Jun. 29, 2017

(51) Int. Cl.
| | | |
|---|---|---|
| *G06F 17/30* | (2006.01) | |
| *G06F 17/22* | (2006.01) | |
| *G06F 17/24* | (2006.01) | |
| *H04L 29/08* | (2006.01) | |
| *G06F 8/71* | (2018.01) | |

(52) U.S. Cl.
CPC ............ *G06F 17/2288* (2013.01); *G06F 8/71* (2013.01); *G06F 17/24* (2013.01); *G06F 17/30011* (2013.01); *G06F 17/3053* (2013.01); *H04L 67/1097* (2013.01)

(58) Field of Classification Search
CPC .. G06F 17/2288; G06F 17/24; G06F 17/2247; G06F 17/212; G06F 17/30011; G06F 17/3053
USPC ........................................................ 715/229
See application file for complete search history.

(56) References Cited

U.S. PATENT DOCUMENTS

| | | | |
|---|---|---|---|
| 7,058,667 B2 | 6/2006 | Goldick | |
| 7,818,293 B2 | 10/2010 | Dullanty et al. | |
| 7,974,948 B2 | 7/2011 | Baer et al. | |
| 8,417,673 B2 | 4/2013 | Stakutis et al. | |
| 9,002,908 B2 | 4/2015 | Stidworthy et al. | |
| 2002/0107886 A1 | 8/2002 | Gentner et al. | |
| 2004/0054972 A1 | 3/2004 | Thijssen et al. | |
| 2005/0071755 A1 | 3/2005 | Harrington et al. | |
| 2007/0150433 A1 | 6/2007 | Chen | |
| 2009/0013009 A1 | 1/2009 | Nakayama | |
| 2010/0310192 A1 | 12/2010 | Kuchibhotla et al. | |
| 2011/0010332 A1* | 1/2011 | Vasudevan ............. | G06Q 10/10 707/608 |
| 2012/0185762 A1 | 7/2012 | Ozer et al. | |

(Continued)

OTHER PUBLICATIONS

Collins-Sussman, et al., "Version Control with Subversion", Published on: Aug. 16, 2011, Available at: http://svnbook.red-bean.com/en/1.6/svn-book.html#svn.basic.version-control-basics.

(Continued)

*Primary Examiner* — Scott T Baderman
*Assistant Examiner* — Hassan Mrabi
(74) *Attorney, Agent, or Firm* — Merchant & Gould P.C.

(57) ABSTRACT

Memory conserving versioning of an electronic document is provided. Client versioning factors are analyzed by a client versioning engine and server versioning factors are analyzed by a server versioning engine for determining when an electronic document should be stored as a new version. Accordingly, new versions of an electronic document are only created when determined to be sufficiently important, thus reducing the amount of memory required for increased version payload.

20 Claims, 9 Drawing Sheets

(56) References Cited

U.S. PATENT DOCUMENTS

| | | |
|---|---|---|
| 2014/0006352 A1 | 1/2014 | Sachs et al. |
| 2014/0032502 A1 | 1/2014 | Kraley |
| 2014/0095456 A1* | 4/2014 | Pidduck ............ G06F 17/30309 707/695 |
| 2014/0280204 A1* | 9/2014 | Avery ............... G06F 17/30424 707/748 |
| 2017/0017779 A1* | 1/2017 | Huang .................... G06F 21/16 |

OTHER PUBLICATIONS

Kaufman, Lori, "Lesson 5: Versioning, Comparing, and Combining Documents", Published on: Mar. 21, 2014, Available at: http://www.howtogeek.com/school/microsoft-word-for-teams/lesson5/all/.
PCT International Search report and Written Opinion in application PCT/US2016/066742 dated Mar. 14, 2017, 13 pages.
"Second Written Opinion Issued in PCT Application No. PCT/US2016/066742", dated Sep. 15, 2017, 6 Pages.
"International Preliminary Report on Patentability Issued in PCT Application No. PCT/US2016/066742", dated Dec. 21, 2017, 7 Pages.

* cited by examiner

FIG. 3B

History 306
July 15, 2020
John Doe renamed the file. 5:31 PM — 114, 116a, 102a
Bob White saved the file. 4:51 PM — 308, 116a
Open version 310 — 102b
Jane Black saved the file. 3:10 PM — 312a
John Doe saved the file. 11:15 AM — 116b
Open version 306
July 14, 2020
Bob White shared the file. 8:33 PM — 312b
Jane Black saved the file. 3:59 PM — 312c
Mark Long saved the file. 3:42 PM — 116c
Open version — 102n
Cal Palmer saved the file. 1:08 PM — 116d
Open version

302

MEMORY CONSERVING VERSIONING OF AN ELECTRONIC DOCUMENT

BACKGROUND

As computing devices are becoming increasingly mobile, cloud storage has become a standard for storing documents and transferring them between devices and users. For example, users are enabled to access their documents virtually anywhere with an Internet connection. Additionally, users are enabled to easily share documents with other users, and collaborate with other users to create documents simultaneously.

More and more applications are utilizing auto-save functions to automatically save documents without requiring users to explicitly command an application to save a document. For example, an application may automatically save a document at predetermined intervals, which helps to reduce the risk or impact of data loss. As can be appreciated, with increased usage of auto-save, documents' version histories are growing larger and more quickly. Accordingly, storage services are being taxed more frequently, and incur more storage costs to handle this increased version payload.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter.

Aspects are directed to an automated system, method, and device for memory conserving versioning of an electronic document. According to an aspect, as a client user of a client device makes edits to an electronic document stored in a server storage repository, a client versioning engine analyzes various client-specific factors associated with the edits made by the client to the electronic document to determine if a set of client edits should be stored as a new version. For example, the client versioning engine makes a determination as to when an importance level associated with the client edits rises to a threshold warranting creation of a new version of the electronic document for ensuring useful versions of the document, and when the threshold is reached, requests the server to create a new version.

According to another aspect, when the server receives a set of client edits from a client to save to an electronic document, a server versioning engine analyzes various server-specific factors associated with saving and versioning the electronic document to determine if the set of client edits should be stored as a new version. For example, the server versioning engine makes a determination as to whether an importance level associated with the server-specific factors rises to a threshold warranting creation of a new version of the electronic document for ensuring useful versions of the document. When the threshold is reached, the server generates a new version identifier for the electronic document, and saves the client edits to the electronic document using the new version identifier, thus creating a new version of the electronic document that includes the client edits.

According to aspects, by analyzing client and server factors for determining when an electronic document should be stored as a new version, new versions of an electronic document are only created when determined to be sufficiently important, thus reducing the amount of memory storage required for increased version payload.

Examples are implemented as a computer process, a computing system, or as an article of manufacture such as a device, computer program product, or computer readable media. According to an aspect, the computer program product is a computer storage media readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings:

FIGS. 3A and 3B are illustrations of example user interfaces for viewing version histories of an electronic document;

DETAILED DESCRIPTION

Figure 1:
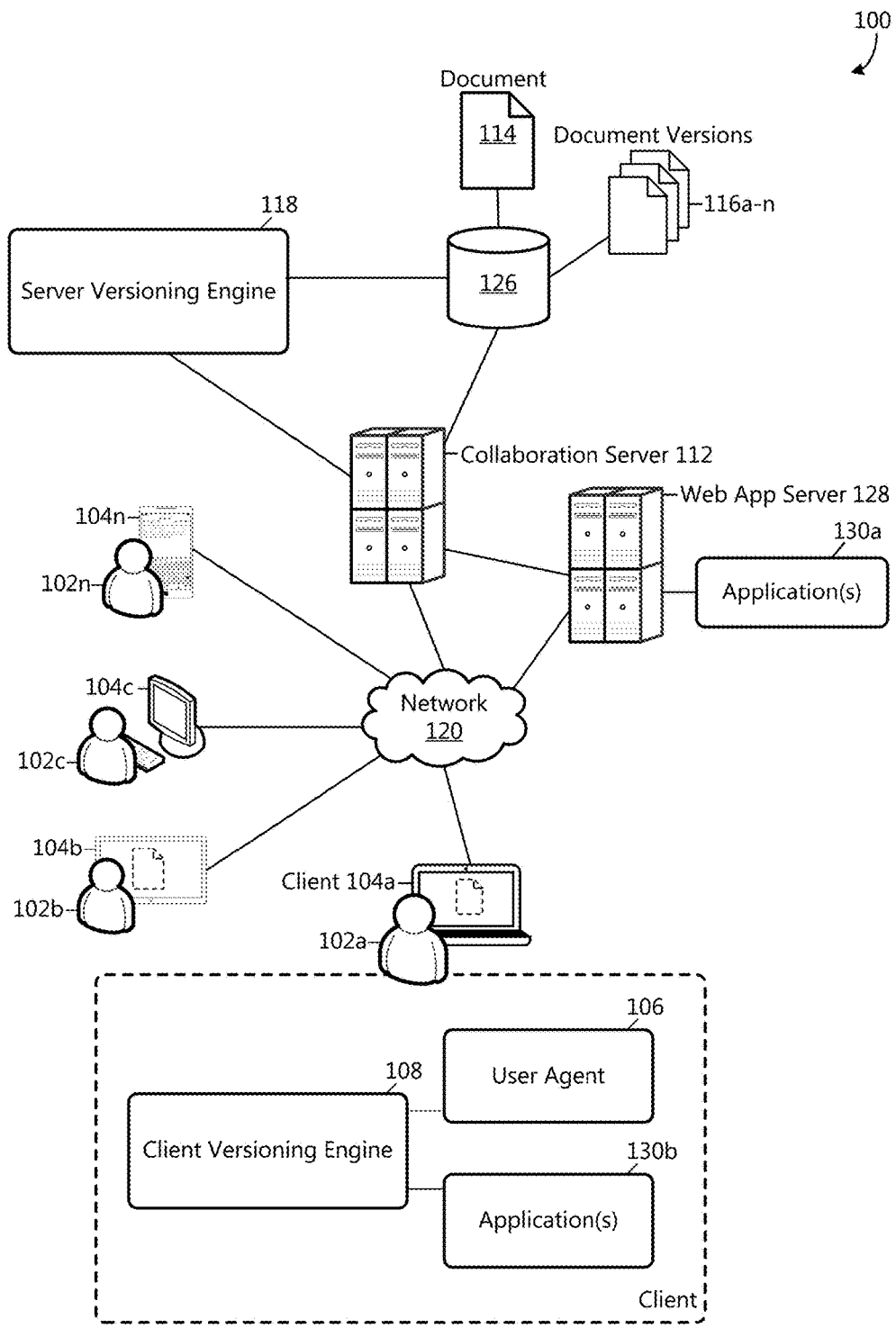
FIG. 1 is a simplified block diagram showing components of an example system for memory conserving versioning of an electronic document.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage media for memory conserving versioning of an electronic document. With reference now to FIG. 1, a simplified block diagram illustrating aspects of an example system 100 for memory conserving versioning of an electronic document. The example system 100 includes a collaboration and/or document management server (herein referred to as server 112), illustrative of portal-based computing system for collaboratively creating, managing and sharing electronic documents. In some examples, the server 112 is a shared resources server located at an enterprise accessible by various clients 104a-n (collectively, 104). In other examples, the server 112 is a shared resources server remotely located from the various clients 104 at which various client users 102a-n (collectively, 102) may store and collaborate on various electronic documents 114.

As illustrated, the server 112 comprises a local or remote storage repository 126 at which the one or more electronic documents 114 are stored. According to examples, the storage repository 126 is operative to store a history of versions 116a-n (collectively, 116) of each electronic document 114. The storage repository 126 is further operative to store version history metadata, for example, information about when changes were made to an electronic document 114, what changes were made, and who made them. Client users 102 are enabled to view and access the version history of an electronic document 114. For example, when a client user 102a is working on an electronic document 114, either alone or collaboratively with other client users 102b-n, the client user 102a may desire to view or revert back to a previous version 116 of an electronic document 114. As another example, a client user 102a may desire to view a history of changes made to an electronic document 114, and may desire to view who made the changes and when.

Client users 102 are enabled to access the server 112, the electronic documents 114, and the version histories from a variety of client devices 104a-n (collectively, 104) via a network 120, such as, but not limited to, the Internet, wide area networks, local area networks, and combinations thereof. Examples of suitable client devices 104 include, but are not limited to, desktop computers, laptop computers, tablet computers, mobile phones, personal digital assistants, wearable devices, gaming devices, and smart appliances. Client users 102 are illustrative of one or more users who may generate, edit, or otherwise interact with electronic documents 114 as described herein.

The system 100 includes one or more applications 130a,b (collectively, 130) used to view, generate, and edit electronic documents 114. Examples of suitable applications 130 include, but are not limited to, word processing, spreadsheet, database, slide presentation, electronic mail, drawing, web browser, media player, and game applications. In some examples, the application(s) 130 are web applications 130a run on a web application server 128, and communicate with a user agent 106, such as a browser, via the network 120. The user agent 106 provides a user interface that allows a user 102 to interact with application content, electronic documents 114, and version histories stored in the storage repository 126. The user interface is displayed on a display of the client device 104 running the user agent 106. In some embodiments, the user agent 106 is a dedicated client application that provides a user interface and access to electronic documents 114 and version histories stored in the storage repository 126. In other examples, the application(s) 130 are local applications 130b stored and executed on the client device 104, and provide a user interface that allows a user 102 to interact with application content, electronic documents 114, and version histories stored in the storage repository 126.

Figure 2:
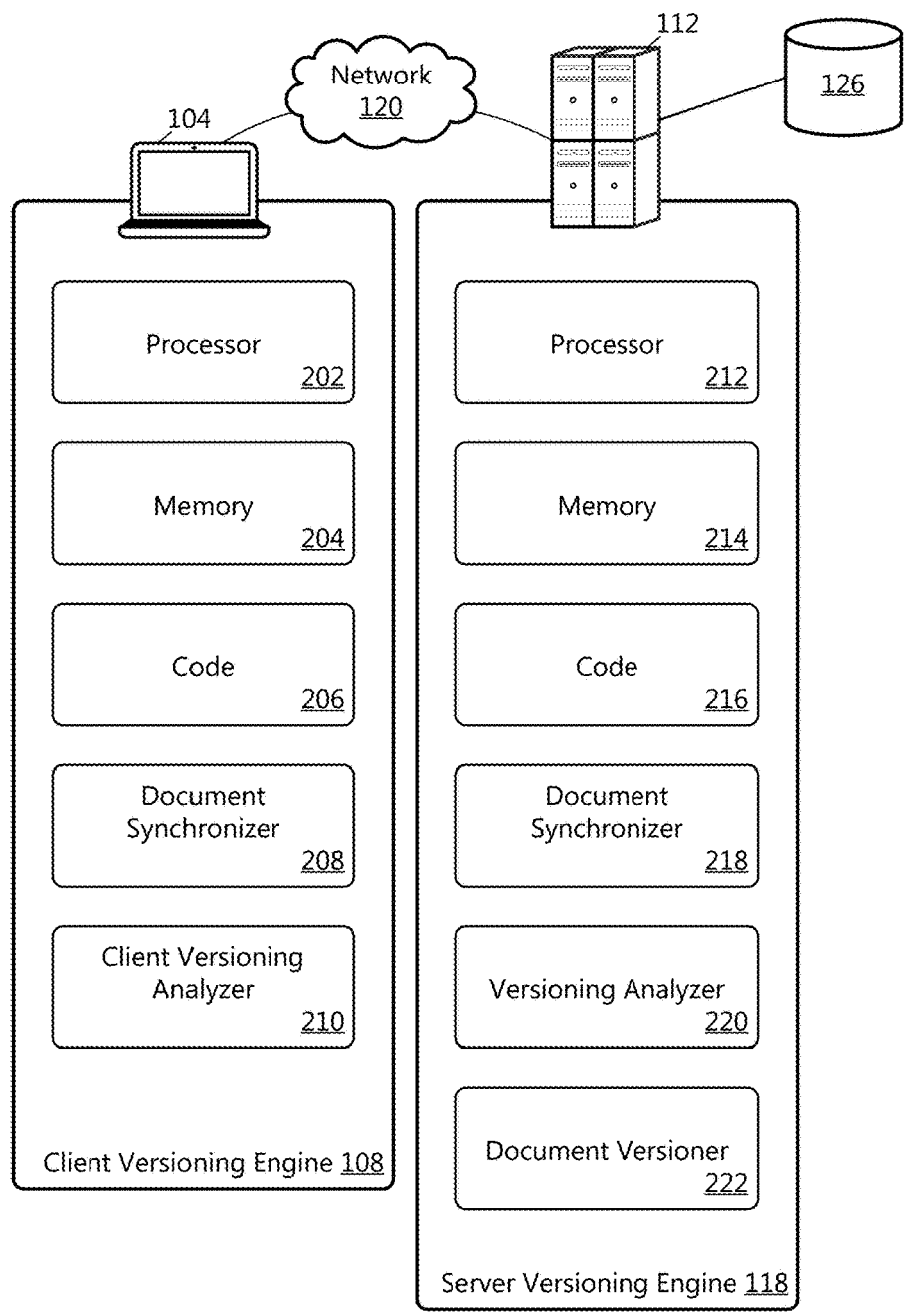
FIG. 2 is a simplified block diagram showing components of a client versioning engine and a server versioning engine.

The system 100 includes a client versioning engine 108 and a server versioning engine 118, which are described now with respect to FIG. 2. According to an example, the client versioning engine 108 is illustrative of a software module, system, or device operative to synchronize changes made between a local copy of an electronic document 114 with a persisted copy of the electronic document 114 stored in the storage repository 126 associated with the server 112, and determine when a new version of the document 114 should be created. When a positive determination is made to create a new version, the client versioning engine 108 is further operative to communicate requests to the server 112 to save client edits of the electronic document 114 as a new version. The client versioning engine 108 is in communication with the server 112 via a network 120 as described above.

According to examples, the client versioning engine 108 includes at least one processor 202 and memory 204 storing code 206 which is executable by the processor 202 to cause a client versioning analyzer 210 to receive changes made to the local copy of an electronic document 114, and analyze the changes to determine whether a new version of the electronic document 114 should be created, or whether to save the changes to the current version of the electronic document 114 stored in the storage repository 126. For example, the client versioning analyzer 210 is operative to receive edits made by a client user 102a via an application 130.

When client edits are made to an electronic document 114 at a client device 104, the client versioning analyzer 210 is operative to analyze various factors related to the client edits for determining whether to request creation of a new version of the electronic document 114. These various factors are referred to herein as client versioning factors. A non-limiting listing and description of various client versioning factors are described below.

One example of a client versioning factor includes a time interval client versioning factor. According to an aspect, the client versioning analyzer 210 is operative to analyze a time interval since a last update request of client edits was sent to the server 112, and derive a value associated with the time interval client versioning factor. For example, the greater the time interval since a last update request or a last update request comprising a flag requesting the server 112 to create a new version, the more necessitous it may seem to the client versioning analyzer 210 to generate a new version of the electronic document 114. Accordingly, the greater the time interval, the higher the time interval client versioning factor value derived by the client versioning analyzer 210.

Another example of a client versioning factor includes an edit size client versioning factor. According to an example, the client versioning analyzer 210 is operative to analyze a data size of an individual change, and derive a value associated with the size of the change. For example, the larger the data size of the edit (e.g., a large copy and paste, insertion of a video file, etc.), the more reason to create a new version of the document 114. Accordingly, the larger the data size of the edit, the higher the value associated with the edit size client versioning factor.

Another example of a client versioning factor includes an edit type client versioning factor. According to an aspect, the client versioning analyzer 210 is operative to analyze the type of data included in the client edit, and derive a value associated with the data type. For example, the client versioning analyzer 210 may derive a higher value associated with a data type based on a difficulty level of reproducing the data. As one example, the client versioning analyzer 210 may derive a higher value for an edit comprising an insertion of a table than for an edit comprising an insertion of text. As another example, the client versioning analyzer 210 may derive a higher value for insertion or manipulation of lines and shapes (e.g., forming a drawing) than for an edit comprising a change of font color.

According to an aspect, the edit type client versioning factor value is application-dependent such that a value associated with a change related to a specific data type in one application 130 may differ from a value associated with a changed related to the same data type in another application 130. For example, a change associated with a specific data type may be considered more or less significant depending on which application 130 is being used to edit the document 114.

An illustrative example application-dependent client versioning factor valuing is insertion of an image in an electronic document 114. For example, if a client user 102 is editing a slide presentation document using a slide presentation application, where the document may include a plurality of images, the edit type client versioning factor value associated with insertion of the image may be less than the value associated with insertion of the image in a word processing document using a word processing application, where the majority of the content is text.

According to an aspect, the client versioning analyzer 210 generates a versioning score based on the derived values of the various client versioning factors, and compares the versioning score against a versioning threshold score. When the versioning score meets or exceeds the versioning threshold score, the client versioning analyzer 210 makes a determination that a new version of the electronic document 114 should be created.

According to examples, the processor 202 is further operative to cause a client document synchronizer 208 to generate a request to synchronize changes made to a local copy of an electronic document 114 to the master copy of the electronic document 114 stored in the storage repository 126. For example, the client document synchronizer 208 generates an update request including the changes made to the client copy of the electronic document 114 since opening the document or since a last request to update the document, and transmits the update request to the server 112. According to an aspect, when a determination is made by the client versioning analyzer 210 that a new version of the electronic document 114 should be created (e.g., the versioning score of client edits meets or exceeds the versioning threshold score), the client document synchronizer 208 is further operative to append a flag to the update request requesting the server 112 to save the changes as a new version of the electronic document 114.

According to some examples, the client document synchronizer 208 is further operative to receive an update notification from the server 112 to synchronize the local copy of the electronic document 114 with changes made to the current server version of the electronic document 114. For example, when more than one client user 102 is editing an electronic document 114, changes made at each client 104 are communicated to the server 112. The server 112 may either push the updates to the other clients 104, or push an update notification to the other clients 104 notifying the clients that there are changes to the electronic document 114, which need to be synchronized. In some examples, the server 112 sends updates to a client 104 in response to an update request. For example, communication is initiated by the client 104, wherein the client document synchronizer 208 is operative to request updates from the server 112 (e.g., pull updates).

According to examples, the server versioning engine 118 includes at least one processor 212 and memory 214 storing code 216 which is executable by the processor 212 to cause a server document synchronizer 218, illustrative of a software module, system, or device, to receive a request from a client 104 to synchronize changes made to a client copy of an electronic document 114 to the master copy of the electronic document 114 stored in the storage repository 126. For example, the server document synchronizer 218 receives an update request including client edits to the electronic document 114. According to an aspect, the client edits are changes made to the client copy of the electronic document 114 since the last save of the document to the storage repository 126. In some examples, the update request includes a request to save the client edits to the current version stored in the storage repository 126. In other examples, the update request includes a flag requesting the server 112 to save the client edits as a new version of the electronic document 114.

According to examples, when a client user 102 collaborates with one or more other client users 102 to create an electronic document 114, the plurality of client users 102 are enabled to simultaneously edit the document. When a client edit made by one of the client users 102 is saved to the electronic document 114 (either to the current version or to a newly created version), the server document synchronizer 218 is further operative to notify the other clients 104 that there are changes to the document 114 that need to be synchronized with the copies the other client users 102 are simultaneously editing. In some examples, the server document synchronizer 218 sends an update notification including the client edits and version information to each of the other clients 104 (e.g., the server 112 pushes the updates to the clients 104). In other examples, the server document synchronizer 218 sends an update notification to each of the other clients 104 that notifies the client 104 that there are updates, such that each client 104 can request the client edit updates from the server 112 (e.g., the clients 104 pull the updates from the server 112).

According to examples, the processor 212 is further operative to cause a server versioning analyzer 220, illustrative of software module, system, or device, to analyze various server versioning factors for determining whether to create a new version of an electronic document 114 when an update request for the electronic document 114 is received. According to an aspect, the server versioning analyzer 220 is operative to generate a versioning score based on the derived values of the various server versioning factors, and compare the versioning score against a versioning threshold score. When the versioning score meets or exceeds the versioning threshold score, the server versioning analyzer 220 makes a determination that a new version of the electronic document 114 should be created, and instructs a document versioner 222 to create an updated version of the electronic document 114 including received client edits since a last save of the document 114. A non-limiting description of various server versioning factors are listed and described below.

One example of a server versioning factor includes a client version request flag versioning factor. For example, the server versioning analyzer 220 is operative to determine whether the update request includes a flag requesting for saving the client edits as a new version of the electronic document 114. The server versioning analyzer 220 is operative to derive a value associated with whether or not a new version request flag is included with the update request. In some examples, the client versioning score is included with the update request. Accordingly, the server versioning analyzer 220 is operative to derive a value based on the client versioning score. For example, the higher the client versioning score, the higher the client version request flag versioning factor value.

Another example of a server versioning factor includes a save time interval server versioning factor. For example, the server versioning analyzer 220 is operative to analyze a time interval since a last save of client edits was made, and derive a value associated with the save time interval server versioning factor. For example, the greater the time interval since a last save, the higher the value associated with the save time interval server versioning factor. In some examples, a single client user 102 may be editing an electronic document 114. Accordingly, the save time interval since a last save is related to the time interval since a last save of the single client user's edits to the electronic document 114. In other examples, a plurality of client users 102 may be concurrently editing an electronic document 114. Accordingly, the time interface since a last save is related to the time interval since a last save of any of the plurality of client users' edits to the electronic document 114.

Another example of a server versioning factor includes a version time interval server versioning factor. For example, the server versioning analyzer 220 is operative to analyze a time interval since a last creation of a version of the electronic document 114 was made, and derive a value associated with the version time interval server versioning factor. For example, the greater the time interval since a last version creation, the higher the value associated with the version time interval server versioning factor.

Another example of a server versioning factor includes a storage server versioning factor. According to an aspect, the server versioning analyzer 220 is operative to analyze an amount of storage available to a particular client user 102 or group of client users, and derive a value associated with the storage server versioning factor.

In some examples, the available storage amount is based on a subscription level associated with the client user 102. For example, if a client user 102 has a free consumer subscription, the client user 102 may have less storage space on the server 112 as would another client user 102 who has a paid subscription. Accordingly, if client edits are received from a particular client user 102 associated with a subscription level with lesser available storage space, the server versioning analyzer 220 is operative to derive a lower storage server versioning factor value for the received client edits. Alternatively, if client edits are received from a particular client user 102 associated with a subscription level with greater or unlimited available storage space, the server versioning analyzer 220 is operative to derive a higher storage server versioning factor value for the received client edits.

In some examples, the server versioning analyzer 220 is operative to derive a value associated with the storage server versioning factor based on how client edits are stored, for example, block storage, table storage, etc. According to aspects, by analyzing client-side factors and server-side factors for determining when to create a new version of an electronic document 114, and by intelligently creating new versions when a level of importance is reached, a number of versions saved to the storage repository 126 is reduced, thus reducing an amount of memory storage required for the electronic document 114.

According to examples, the server versioning engine 118 includes a document versioner 222, illustrative of a software module, system, or device operative to create an updated version of the electronic document 114 comprising received client edits since a last save of the electronic document 114. According to an aspect, the document versioner 222 is further operative to generate a version identifier assigned to the updated version of the electronic document 114, and store the updated version of the electronic document 114 in the storage repository 126. According to an aspect, the storage repository 126 continues to store the previous version 116 of the electronic document 114 in a version history of the electronic document 114.

As described above, a client user 102 is enabled to view and access a version history 302 comprising a historical list of versions 116 of an electronic document 114. According to one example and with reference to FIG. 3A, a version history 302 comprising a historical list of versions 116 of an electronic document 114 can be displayed within an application user interface 300 of an application 130 utilized by a client user 102 to edit a client copy 314 of the electronic document 114. For example, the historical list 302 may be displayed in a task pane in the application user interface 300.

Figure 3A:
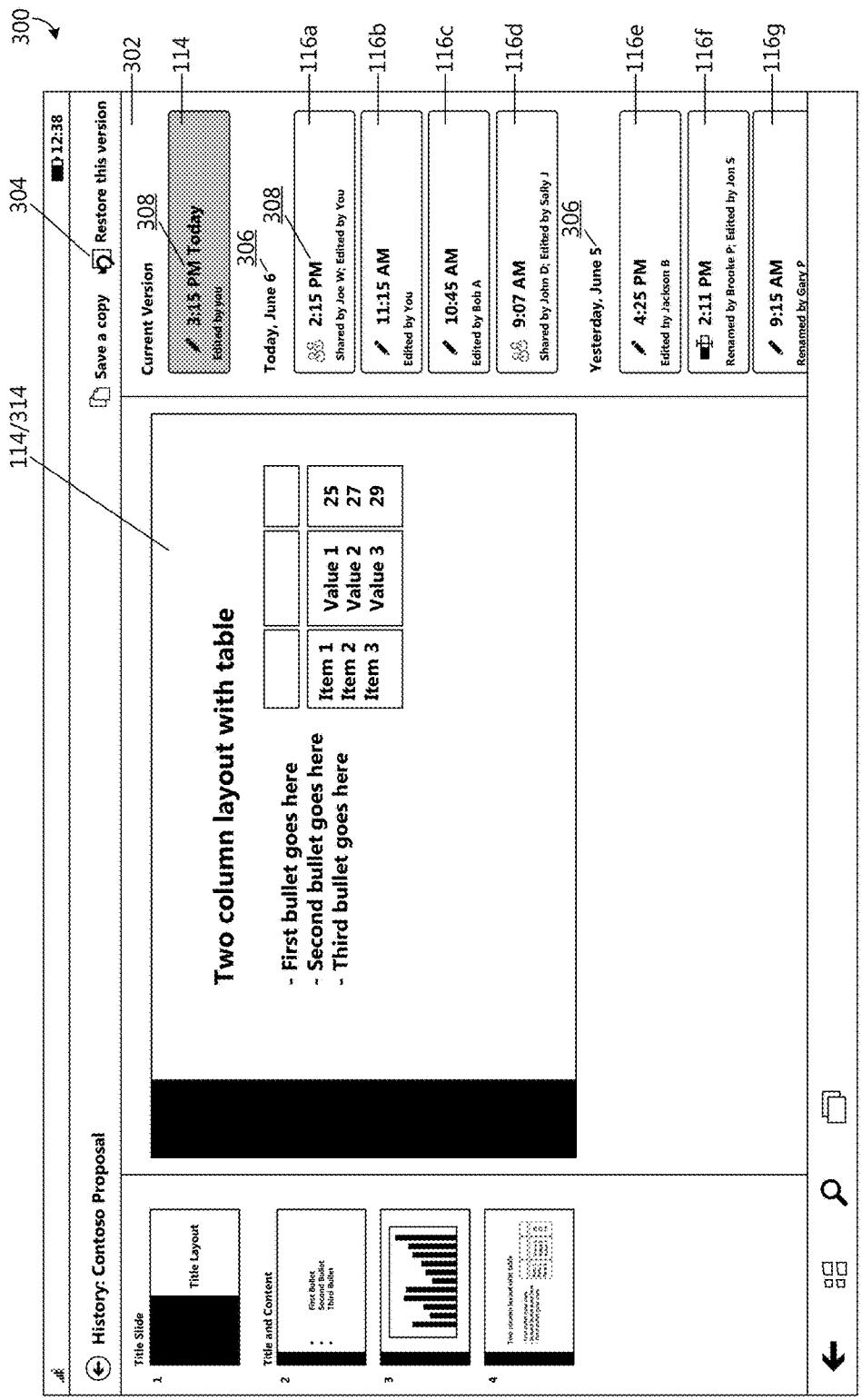

According to the example illustrated in FIG. 3A, the example version history 302 includes a listing element representative of the current version of the electronic document 114 and one or more listing elements representative of one or more previous versions 116 of the electronic document 114. In some examples, the listing elements of previous versions 116 are listed chronologically. Each listing element of a previous version 116 in the historical list 302 may include additional information, such as a date 306 and timestamp 308 associated with the last save of client edits to the previous version 116 and a reason why the version 116 was created (e.g., "edited by you," "shared by John," "renamed by Bob").

According to an aspect, the listing elements in the historical list 302 are selectable, wherein selection of a listing element associated with a previous version 116 enables the client user 102 to view the selected version 116. For example, if an electronic document 114 is collaboratively created by a plurality of client users 102a-n, a client user 102 of the plurality of client users 102a-n may wish to view one or more previous versions 116 to see how the electronic document 114 has evolved, which client user 102 made which client edits, and when.

According to an aspect, a functionality control 304 is provided for enabling the user 102 to restore a selected previous version 116. For example, the client user 102 may desire to revert to a previous version 116 of the electronic document 114.

According to another example and with reference to FIG. 3B, a second example version history 302 is illustrated. In the illustrated example, the historical list includes a listing element representative of the current version of an electronic document 114, listing elements representative of saves 312a-c of the electronic document 114, and listing elements representative of previous versions 116a-d of the electronic document 114. The listing elements are chronologically arranged, and include a date 306 and timestamp 308 associated with the save 312 or version 116 creation.

According to an aspect, a selectable user interface element 310 is provided with each previous version 116 for enabling a client user 102 to open a previous version 116 of the electronic document 114. As described above with respect to FIG. 3A, other information may be provided, for example, information associated with which client user 102 provided client edits that resulted in a save 312 or a new version 116 of the electronic document 114. As another example, other information may include information associated with the action or client edit performed by the client user 102 resulting in a save 312 or a new version 116 of the electronic document 114. As should be appreciated, the examples illustrated in FIGS. 3A and 3B are only exemplary and are not meant to be limiting.

Figure 4:
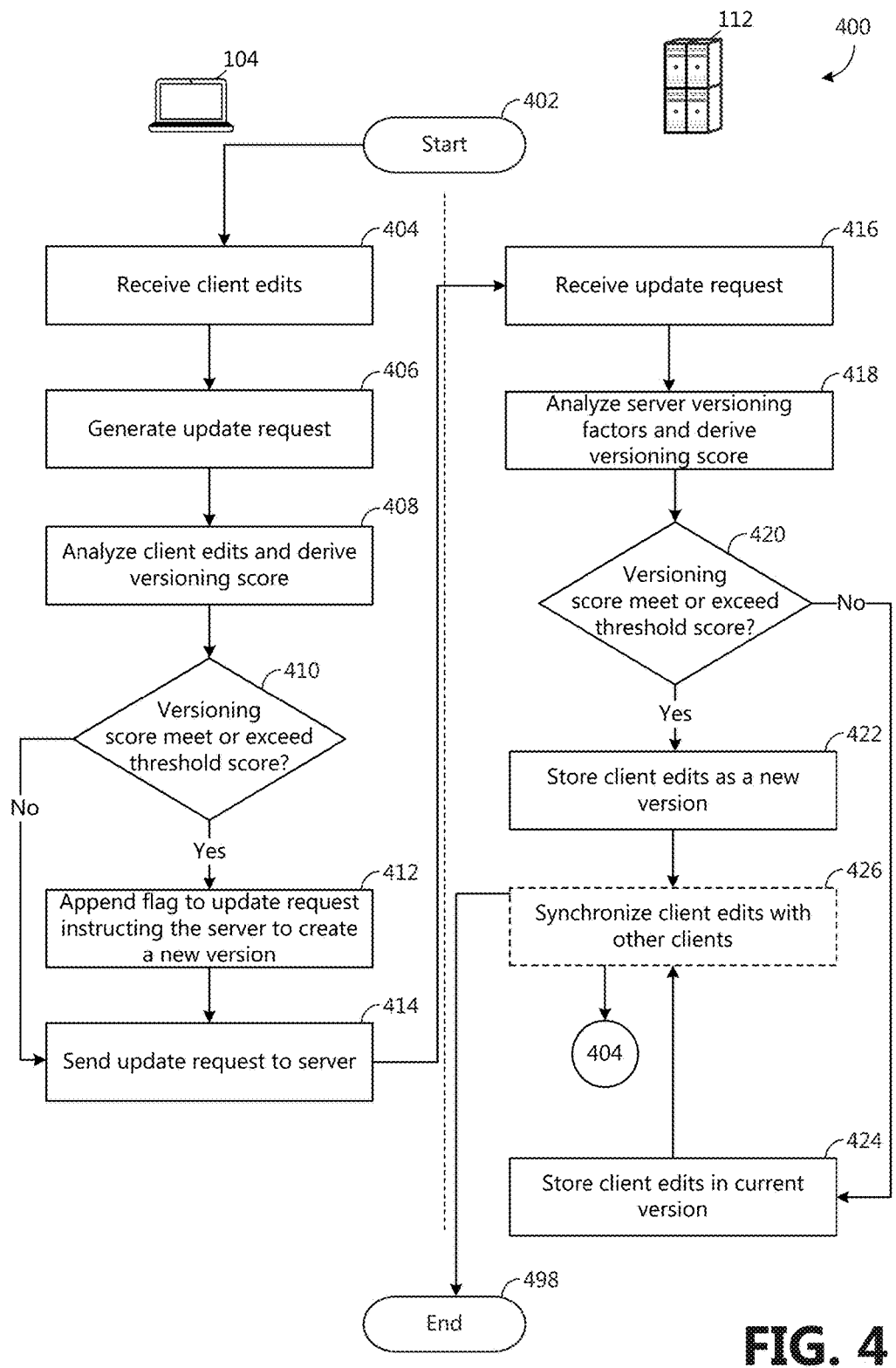
FIG. 4 is a flow chart showing general stages involved in an example method for memory conserving versioning of an electronic document.

Having described an operating environment, various components of the client versioning engine 108 and the server versioning engine 118, and examples of providing a view of versions associated with an electronic document 114 to a user 102 with respect to FIGS. 1-3, FIG. 4 is a flow chart showing general stages involved in an example method 400 for memory conserving versioning of an electronic document 114. According to some examples, the example method 400 applies to a single user embodiment. In other examples, the example method 400 applies to a multi-user embodiment. With reference now to FIG. 4, the method 400 begins at start OPERATION 402, where a client user 102 of a client device 104 performs edits of an electronic document 114 stored in a collaboration and/or document management server storage repository 126. For example, the client user 102 may add content, remove content, modify content, rename the electronic document 114, or explicitly save or share the electronic document 114. When client edits are made to a client copy 314 of the electronic document 114, the client document synchronizer 208 generates an update request 406 requesting the server 112 to update the server copy of the electronic document 114 to include the client edits.

The method 400 continues to OPERATION 408, where the client versioning analyzer 210 analyzes the client edits, and generates a versioning score based on derived values of various client versioning factors. For example, the various client versioning factors may include at least one of: a time interval client versioning factor, an edit size client versioning factor, edit type client versioning factor, and an application-dependent edit type client versioning factor. That is, based on various client-specific factors associated with edits made by the client 104 to the electronic document 114, the client versioning analyzer 210 is operative to determine an importance level (i.e., versioning score) associated with creating a new version of the electronic document 114 for ensuring useful versions while reducing the amount of memory storage required to create versions on a more frequent and less intelligent basis.

At DECISION OPERATION 410, the client versioning analyzer 210 compares the versioning score against a versioning threshold score for determining whether the versioning score meets or exceeds the versioning threshold score. When a positive determination is made (i.e., the versioning score meets or exceeds the versioning threshold score), the method 400 proceeds to OPERATION 412, where the client versioning analyzer 210 makes a determination that a new version of the electronic document 114 should be created. Accordingly, the client document synchronizer 208 appends a flag to the update request requesting the server 112 to save the client edits as a new version of the electronic document 114.

If a negative determination is made at DECISION OPERATION 410 (i.e., the versioning score does not meet or exceed the versioning threshold score) or after OPERATION 412, the method 400 continues to OPERATION 414, where the client document synchronizer 208 transmits the update request to the server 112.

At OPERATION 416, the server document synchronizer 218 receives the update request from the client 114 to synchronize changes made to the client copy 314 of the electronic document 114 to the master copy of the electronic document 114 stored in the storage repository 126.

The method 400 proceeds to OPERATION 418, where the versioning analyzer 220 analyzes various server versioning factors, and generates a versioning score based on derived values of various server versioning factors. For example, the various server versioning factors may include at least one of: a client version request flag versioning factor, a save time interval server versioning factor, a version time interval server versioning factor, and a storage server versioning factor.

That is, based on whether the client requested for a new version to be created and various server-specific factors associated with saving client edits, versioning client edits, and storing capabilities and functionalities, the server versioning analyzer 220 is operative to determine an importance level (i.e., versioning score) associated with creating a new version of the electronic document 114 for ensuring useful versions while reducing the amount of memory storage required to create versions on a more frequent and less intelligent basis.

At DECISION OPERATION 420, a determination is made as to whether the server-generated versioning score meets or exceeds a versioning threshold score. When a positive determination is made at DECISION OPERATION 420 (e.g., the server-generated versioning score meets or exceeds a versioning threshold score), the method 400 proceeds to OPERATION 422, where the server document versioner 222 generates a new version identifier for the electronic document 114, and saves the electronic document 114 with the received client edits using the new version identifier. That is, the server document versioner 222 creates a new version of the electronic document 114, wherein the new version, distinguished by the new version identifier, comprises the client edits received in the update request from the client 104. According to an aspect, the client edits are not applied to previous versions 116 of the electronic document 114.

When a negative determination is made at DECISION OPERATION 420 (i.e., the versioning score does not meet or exceed the threshold score), the method 400 proceeds to OPERATION 424, where the server document synchronizer 218 saves the client edits to the current version of the electronic document 114.

The method 400 proceeds from OPERATION 422 or OPERATION 424 to OPERATION 426, where, if there are one or more other client users 102 concurrently editing the electronic document 114 via one or more other client devices 104 (e.g., a multi-user environment), the server document synchronizer 218 generates and sends an update notification to the one or more other client devices 104. For example, the update notification notifies the client 104 of the save of the client edits to the current version of the electronic document 114 or of the save of the client edits to a new version of the electronic document 114. As described above, in some examples, the update notification includes the client edits (e.g., the server 112 pushes the client edits to the client 104). In other examples, the update notification notifies the client 104 to retrieve the updates from the server 112. The method 400 repeats at OPERATION 404 or ends at OPERATION 498 when the client 104 ends the editing session.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 5:
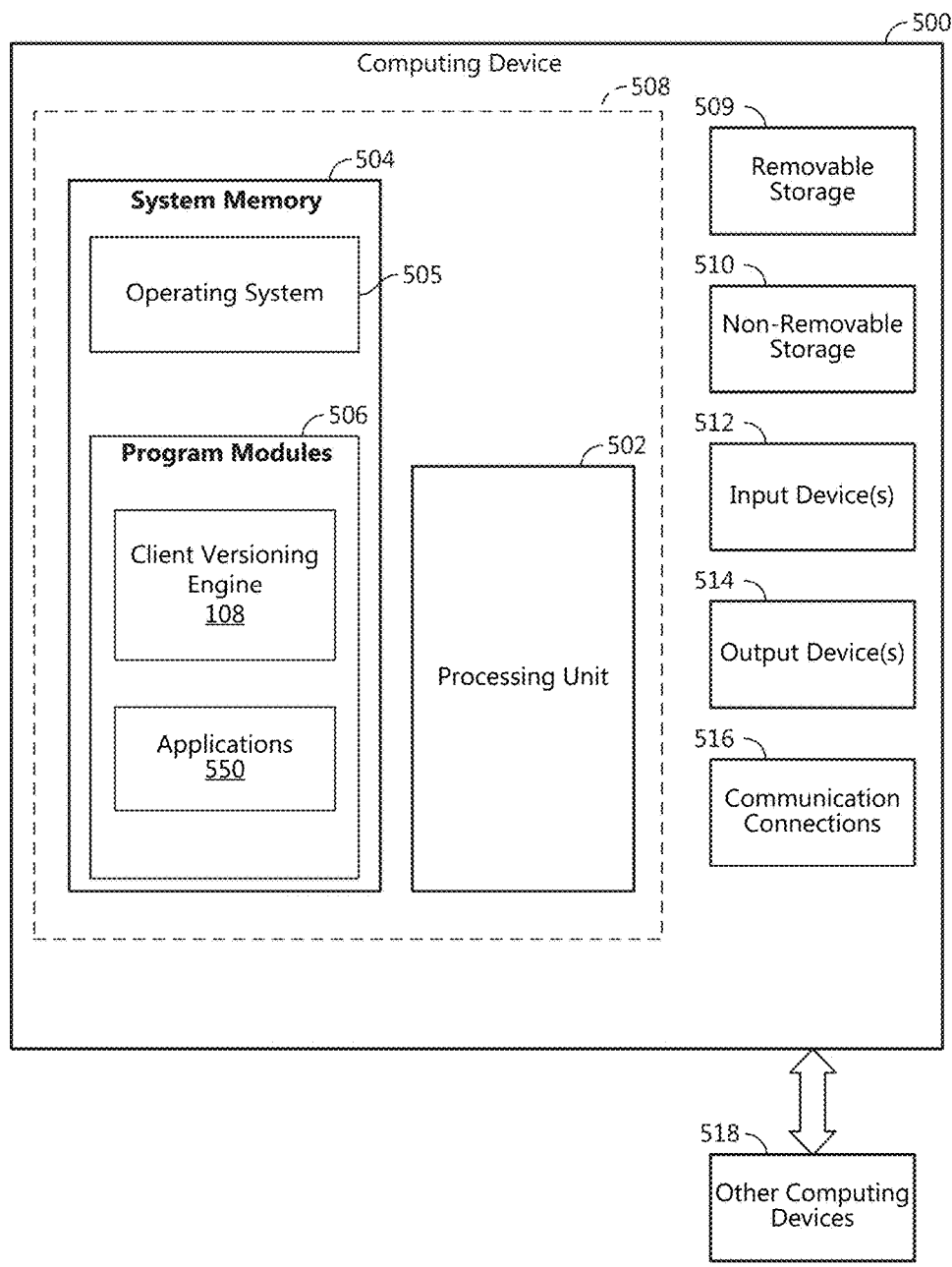
FIG. 5 is a block diagram illustrating example physical components of a computing device.
Figure 6A:
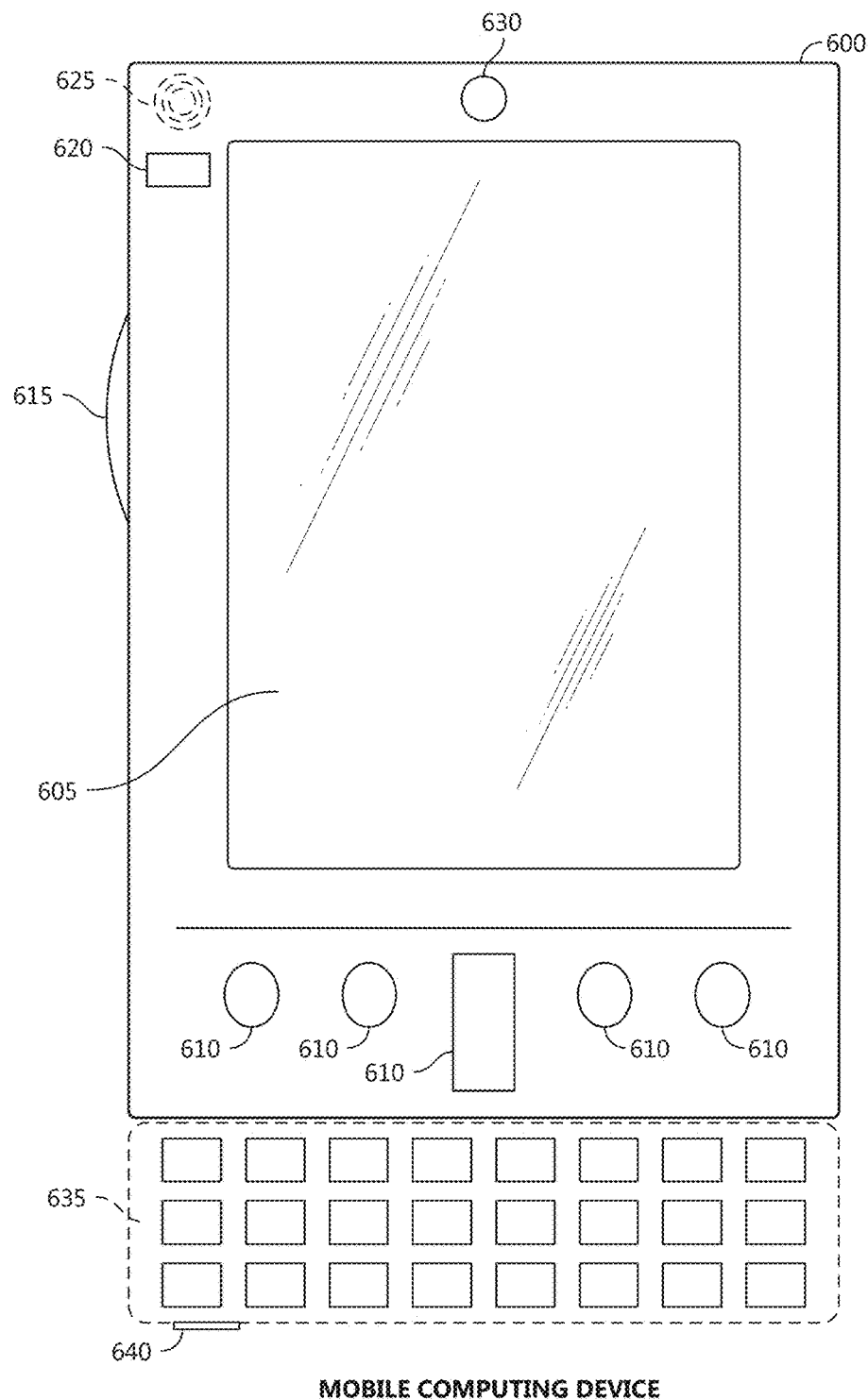
FIGS. 6A and 6B are simplified block diagrams of a mobile computing device.
Figure 6B:
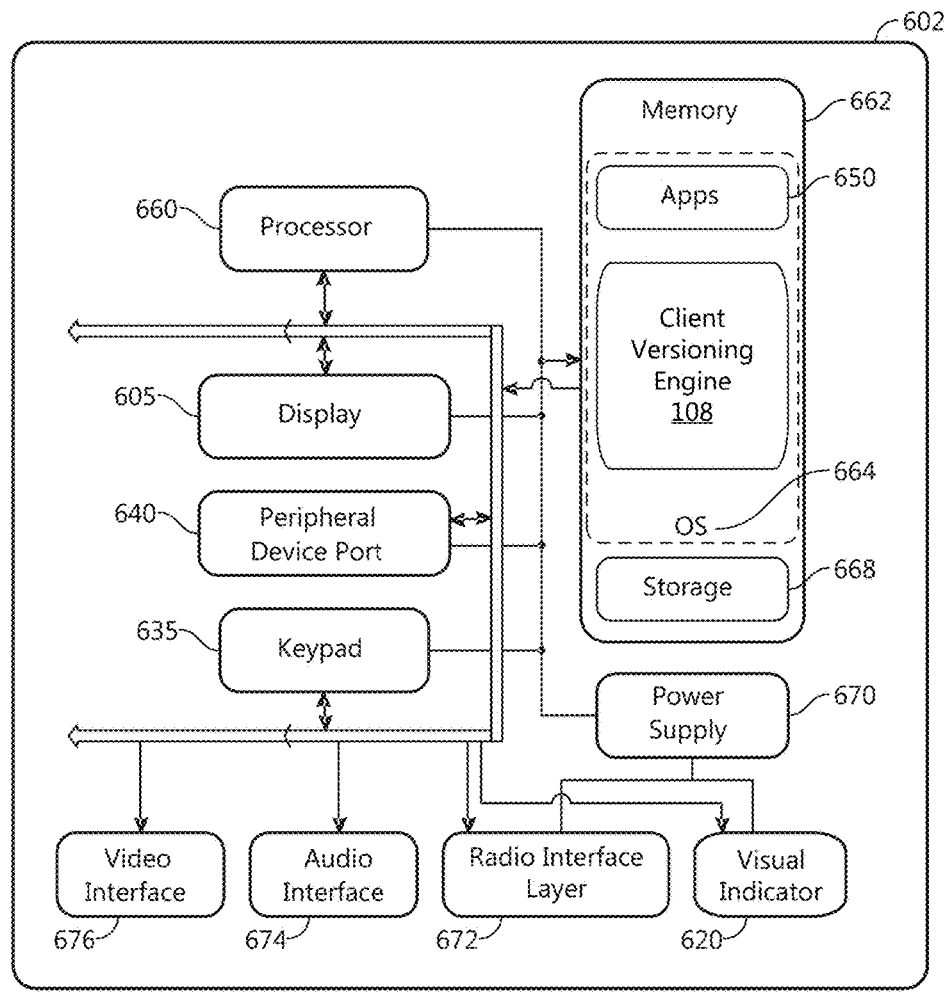
Figure 7:
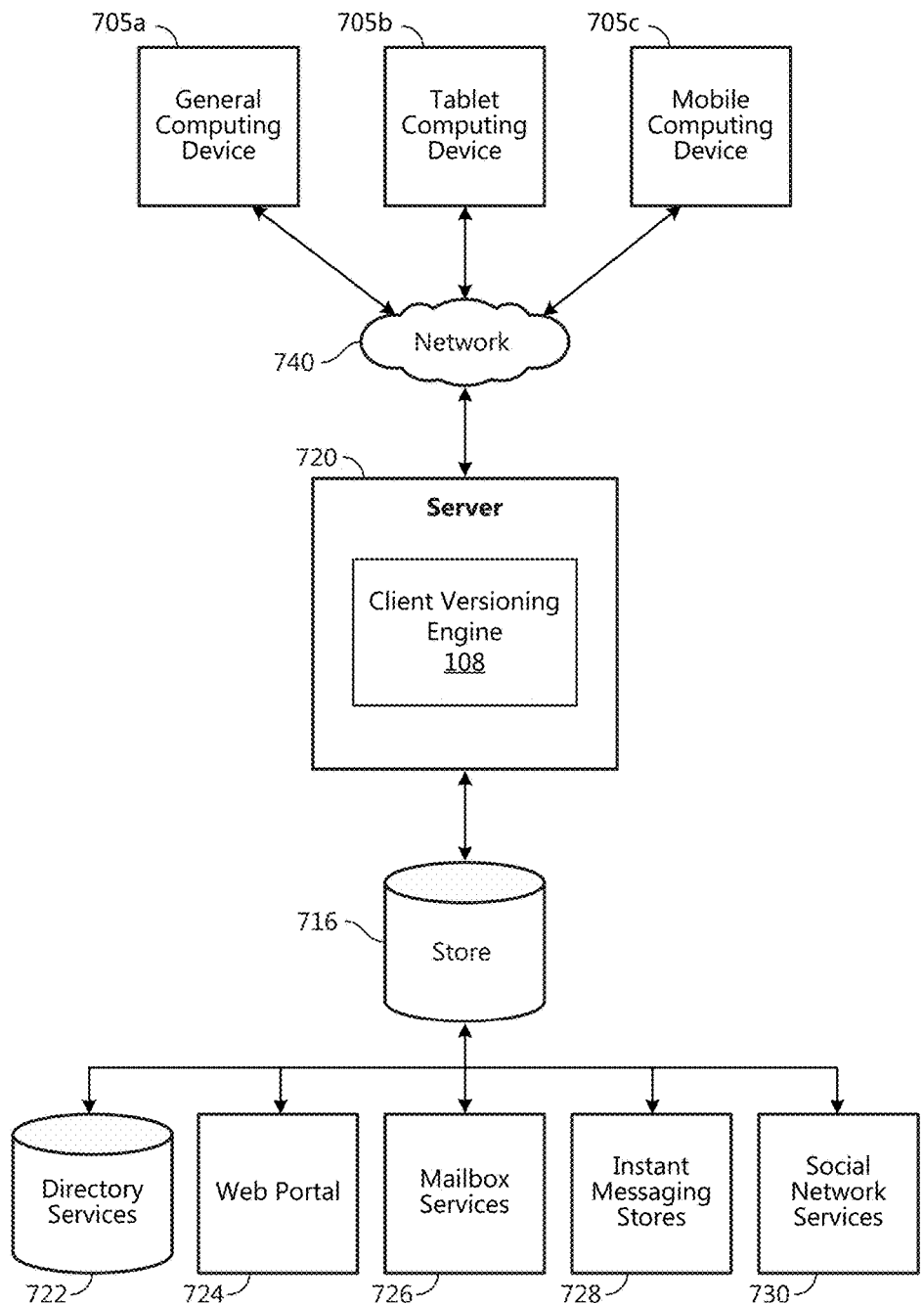
FIG. 7 is a simplified block diagram of a distributed computing system.

FIGS. 5-7 and the associated descriptions provide a discussion of a variety of operating environments in which examples are practiced. However, the devices and systems illustrated and discussed with respect to FIGS. 5-7 are for purposes of example and illustration and are not limiting of a vast number of computing device configurations that are utilized for practicing aspects, described herein.

FIG. 5 is a block diagram illustrating physical components (i.e., hardware) of a computing device 500 with which examples of the present disclosure are be practiced. In a basic configuration, the computing device 500 includes at least one processing unit 502 and a system memory 504. According to an aspect, depending on the configuration and type of computing device, the system memory 504 comprises, but is not limited to, volatile storage (e.g., random access memory), non-volatile storage (e.g., read-only memory), flash memory, or any combination of such memories. According to an aspect, the system memory 504 includes an operating system 505 and one or more program modules 506 suitable for running software applications 550. According to an aspect, the system memory 504 includes the client versioning engine 108. The operating system 505, for example, is suitable for controlling the operation of the computing device 500. Furthermore, aspects are practiced in conjunction with a graphics library, other operating systems, or any other application program, and is not limited to any particular application or system. This basic configuration is illustrated in FIG. 5 by those components within a dashed line 508. According to an aspect, the computing device 500 has additional features or functionality. For example, according to an aspect, the computing device 500 includes additional data storage devices (removable and/or non-removable) such as, for example, magnetic disks, optical disks, or tape. Such additional storage is illustrated in FIG. 5 by a removable storage device 509 and a non-removable storage device 510.

As stated above, according to an aspect, a number of program modules and data files are stored in the system memory 504. While executing on the processing unit 502, the program modules 506 (e.g., client versioning engine 108) perform processes including, but not limited to, one or more of the stages of the method 400 illustrated in FIG. 4. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 5 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 500 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 500 has one or more input device(s) 512 such as a keyboard, a mouse, a pen, a sound input device, a touch input device, etc. The output device(s) 514 such as a display, speakers, a printer, etc. are also included according to an aspect. The aforementioned devices are examples and others may be used. According to an aspect, the computing device 500 includes one or more communication connections 516 allowing communications with other computing devices 518. Examples of suitable communication connections 516 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. According to an aspect, any such computer storage media is part of the computing device 500. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 6A and 6B illustrate a mobile computing device 600, for example, a mobile telephone, a smart phone, a tablet personal computer, a laptop computer, and the like, with which aspects may be practiced. With reference to FIG. 6A, an example of a mobile computing device 600 for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. According to an aspect, the display 605 of the mobile computing device 600 functions as an input device (e.g., a touch screen display). If included, an optional side input element 615 allows further user input. According to an aspect, the side input element 615 is a rotary switch, a button, or any other type of manual input element. In alternative examples, mobile computing device 600 incorporates more or less input elements. For example, the display 605 may not be a touch screen in some examples. In alternative examples, the mobile computing device 600 is a portable phone system, such as a cellular phone. According to an aspect, the mobile computing device 600 includes an optional keypad 635. According to an aspect, the optional keypad 635 is a physical keypad. According to another aspect, the optional keypad 635 is a "soft" keypad generated on the touch screen display. In various aspects, the output elements include the display 605 for showing a graphical user interface (GUI), a visual indicator 620 (e.g., a light emitting diode), and/or an audio transducer 625 (e.g., a speaker). In some examples, the mobile computing device 600 incorporates a vibration transducer for providing the user with tactile feedback. In yet another example, the mobile computing device 600 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 600 incorporates peripheral device port 640, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one example of a mobile computing device. That is, the mobile computing device 600 incorporates a system (i.e., an architecture) 602 to implement some examples. In one example, the system 602 is implemented as a "smart phone" capable of running one or more applications (e.g., browser, e-mail, calendaring, contact managers, messaging clients, games, and media clients/players). In some examples, the system 602 is integrated as a computing device, such as an integrated personal digital assistant (PDA) and wireless phone.

According to an aspect, one or more application programs 650 are loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. According to an aspect, the client versioning engine 108 is loaded into memory 662. The system 602 also includes a non-volatile storage area 668 within the memory 662. The non-volatile storage area 668 is used to store persistent information that should not be lost if the system 602 is powered down. The application programs 650 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

According to an aspect, the system 602 has a power supply 670, which is implemented as one or more batteries. According to an aspect, the power supply 670 further includes an external power source, such as an AC adapter or a powered docking cradle that supplements or recharges the batteries.

According to an aspect, the system 602 includes a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 650 via the operating system 664, and vice versa.

According to an aspect, the visual indicator 620 is used to provide visual notifications and/or an audio interface 674 is used for producing audible notifications via the audio transducer 625. In the illustrated example, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input, such as to facilitate a telephone conversation. According to an aspect, the system 602 further includes a video interface 676 that enables an operation of an on-board camera 630 to record still images, video stream, and the like.

According to an aspect, a mobile computing device 600 implementing the system 602 has additional features or functionality. For example, the mobile computing device 600 includes additional data storage devices (removable and/or non-removable) such as, magnetic disks, optical disks, or tape. Such additional storage is illustrated in FIG. 6B by the non-volatile storage area 668.

According to an aspect, data/information generated or captured by the mobile computing device 600 and stored via the system 602 is stored locally on the mobile computing device 600, as described above. According to another aspect, the data is stored on any number of storage media that is accessible by the device via the radio 672 or via a wired connection between the mobile computing device 600 and a separate computing device associated with the mobile computing device 600, for example, a server computer in a distributed computing network, such as the Internet. As should be appreciated such data/information is accessible via the mobile computing device 600 via the radio 672 or via a distributed computing network. Similarly, according to an aspect, such data/information is readily transferred between computing devices for storage and use according to well-known data/information transfer and storage means, including electronic mail and collaborative data/information sharing systems.

FIG. 7 illustrates one example of the architecture of a system for memory conserving versioning of an electronic document 114 as described above. Content developed, interacted with, or edited in association with the client versioning engine 108 is enabled to be stored in different communication channels or other storage types. For example, various documents may be stored using a directory service 722, a web portal 724, a mailbox service 726, an instant messaging store 728, or a social networking site 730. The client versioning engine 108 is operative to use any of these types of systems or the like for memory conserving versioning of an electronic document 114, as described herein. According to an aspect, a server 720 provides the client versioning engine 108 to clients 705*a,b,c*. As one example, the server 720 is a web server providing the client versioning engine 108 over the web. The server 720 provides the client versioning engine 108 over the web to clients 705 through a network 740. By way of example, the client computing device is implemented and embodied in a personal computer 705*a*, a tablet computing device 705*b* or a mobile computing device 705*c* (e.g., a smart phone), or other computing device. Any of these examples of the client computing device are operable to obtain content from the store 716.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

I claim:

1. A computer-implemented method for memory conserving versioning of an electronic document, comprising:
   receiving, at a server, client edits to the electronic document;
   analyzing, by the server, a plurality of server memory conserving versioning factors for determining whether to save the client edits as a new version of the electronic document, wherein at least one of the plurality of server memory conserving versioning factors is based on an amount of storage available to a particular client user or group of client users, and at least one of the plurality of server memory conserving versioning factors is based on a difficulty level of reproducing the client edits;
   generating a derived value based on the server memory conserving versioning factors;
   generating a versioning score at a client versioning analyzer based on the derived value and the client edits, and comparing the versioning score to a threshold versioning score; and
   in response to the versioning score meeting or exceeding the threshold versioning score:
      generating a new version identifier for the electronic document; and
      saving the client edits to a storage repository using the new version identifier.

2. The computer-implemented method of claim 1, wherein receiving client edits to the electronic document comprises receiving an update request from a client, and wherein the update request is a request for the server to update the electronic document with the client edits.

3. The computer-implemented method of claim 2, wherein receiving the update request from the client comprises receiving an update request comprising a client request to save the client edits as a new version of the electronic document.

4. The computer-implemented method of claim 3, wherein receiving an update request comprising a client request to save the client edits as a new version of the electronic document is in response to analyzing, by the client, a plurality of client memory conserving versioning factors.

5. The computer-implemented method of claim 4, wherein analyzing the plurality of client memory conserving versioning factors comprises:
   deriving a value for each of the plurality of client memory conserving versioning factors;
   generating a versioning score based on the derived values;
   comparing the versioning score against a versioning threshold score; and
   when the versioning score meets or exceeds the versioning threshold score, determining that a new version of the electronic document should be created.

6. The computer-implemented method of claim 5, wherein deriving a value for each of the plurality of client memory conserving versioning factors comprises deriving a value for at least one of:
   a time interval client memory conserving versioning factor;
   an edit size client memory conserving versioning factor;
   an edit type client memory conserving versioning factor; and
   an application-dependent edit type client memory conserving versioning factor.

7. The computer-implemented method of claim 5, further comprising including the versioning score in the client request to save the client edits as a new version of the electronic document.

8. The computer-implemented method of claim 7, wherein analyzing, by the server, the plurality of server memory conserving versioning factors comprises:
   deriving a value for each of the plurality of server memory conserving versioning factors;
   generating a versioning score based on the derived values;

comparing the versioning score against a versioning threshold score; and when the versioning score meets or exceeds the versioning threshold score, determining that a new version of the electronic document should be created.

9. The computer-implemented method of claim 8, wherein deriving a value for each of the plurality of server memory conserving versioning factors comprises deriving a value for at least one of:
- a client version request memory conserving versioning factor;
- a save time interval server memory conserving versioning factor;
- a version time interval server memory conserving versioning factor; and
- a storage server memory conserving versioning factor.

10. The computer-implemented method of claim 9, wherein deriving a value for the client version request memory conserving versioning factor comprises deriving a value based on the client-generated versioning score.

11. The computer-implemented method of claim 1, wherein in response to a negative determination, saving the client edits to a current version of the electronic document.

12. The computer-implemented method of claim 1, further comprising:
- determining whether at least one additional client is concurrently editing the electronic document; and
- in response to a positive determination, generating and transmitting an update notification to the at least one additional client, wherein the update notification provides a notification to the at least one additional client that the electronic document has been updated with client edits.

13. The computer-implemented method of claim 12, wherein the update notification provides a notification to the at least one additional client that the client edits have been saved to a new version of the electronic document.

14. A system for memory conserving versioning of an electronic document, comprising:
- one or more processors for executing programmed instructions;
- memory, coupled to the one or more processors, for storing program instruction steps for execution by the computer processor; and
- a server memory conserving versioning engine comprising:
  - a server document synchronizer operative to receive a client-generated update request including client edits to the electronic document; and
  - a server memory conserving versioning analyzer that analyzes a plurality of server memory conserving versioning factors for determining whether to save the client edits as a new version of the electronic document, and that generates a derived value based on the server memory conserving versioning factors and generates a versioning score based on the derived value and the client edits, and compares the versioning score to a threshold versioning score wherein at least one of the plurality of server memory conserving versioning factors is based on an amount of storage available to a particular client user or group of client users and at least one of the plurality of server memory conserving versioning factors is based on a difficulty level of reproducing the client edits; and
  - a server document versioner operative to:
    - in response to the versioning score begin less than the threshold versioning score:
      - generate a new version identifier for the electronic document; and
      - save the client edits to a storage repository using the new version identifier; and
    - in response to the versioning score meeting or exceeding the threshold versioning score, save the client edits to a current version of the electronic document.

15. The system of claim 14, wherein the client-generated update request includes a client request to save the client edits as a new version of the electronic document.

16. The system of claim 15, wherein the client request to save the client edits as a new version of the electronic document is included in the update request in response to an analysis performed by a client memory conserving versioning analyzer, the client memory conserving versioning analyzer operative to:
- derive a value for each of the plurality of client memory conserving versioning factors;
- generate a versioning score based on the derived values;
- compare the versioning score against a versioning threshold score; and
- when the versioning score meets or exceeds the versioning threshold score, determine that a new version of the electronic document should be created.

17. The system of claim 16, wherein in deriving a value for each of the plurality of client memory conserving versioning factors, the client memory conserving versioning analyzer is operative to derive a value for at least one of:
- a time interval client memory conserving versioning factor;
- an edit size client memory conserving versioning factor;
- an edit type client memory conserving versioning factor; and
- an application-dependent edit type client memory conserving versioning factor.

18. The system of claim 14, wherein in analyzing a plurality of server memory conserving versioning factors, the server memory conserving versioning analyzer is operative to:
- derive a value for each of the plurality of server memory conserving versioning factors;
- generate a versioning score based on the derived values;
- compare the versioning score against a versioning threshold score; and
- when the versioning score meets or exceeds the versioning threshold score, determine that a new version of the electronic document should be created.

19. The system of claim 18, wherein in deriving a value for each of the plurality of server memory conserving versioning factors, the server memory conserving versioning analyzer is operative to derive a value for at least one of:
- a client version request memory conserving versioning factor based on a client-generated versioning score;
- a save time interval server memory conserving versioning factor;
- a version time interval server memory conserving versioning factor; and
- a storage server memory conserving versioning factor.

20. A non-transitory computer readable medium containing computer executable instructions which, when executed by a computer, perform a method for memory conserving versioning of an electronic document, the method comprising:

receiving a client-generated update request including client edits to the electronic document and a client request to save the client edits as a new version of the electronic document;

deriving a value for each of a plurality of server memory conserving versioning factors, wherein at least one of the plurality of server memory conserving versioning factors is based on an amount of storage available to a particular client user or group of client users and wherein at least one of the plurality of server memory conserving versioning factors is based on a difficulty level of reproducing the client edits;

generating a versioning score based on the derived values and the client edits;

comparing the versioning score against a versioning threshold score; and in response to the versioning score meeting or exceeding the versioning threshold score:
  determining that a new version of the electronic document should be created;
  generating a new version identifier for the electronic document; and
  saving the client edits to a storage repository using the new version identifier; and in response to the versioning score not meeting or exceeding the versioning threshold score, saving the client edits to a current version of the electronic document.

* * * * *